Figure 1:
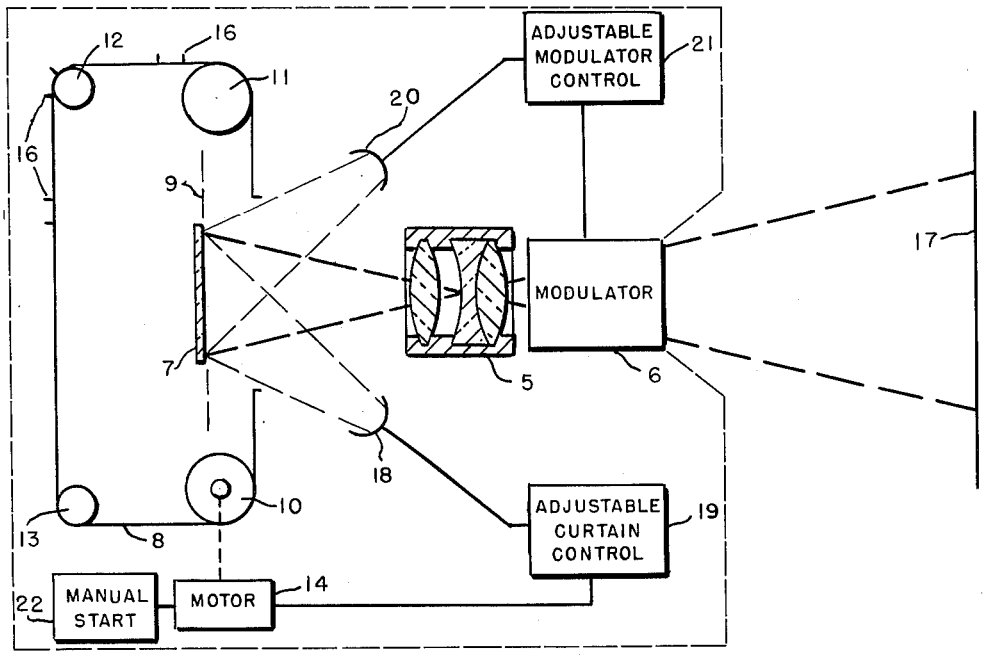

Aug. 22, 1961  C. ORLANDO  2,996,952
PHOTOGRAPHIC RECORDING APPARATUS
Filed July 2, 1958

INVENTOR,
CARL ORLANDO
BY
Harry M. Saragovitz
ATTORNEY.

United States Patent Office 2,996,952
Patented Aug. 22, 1961

2,996,952
PHOTOGRAPHIC RECORDING APPARATUS
Carl Orlando, New Shrewsbury, N.J., assignor to the United States of America as represented by the Secretary of the Army
Filed July 2, 1958, Ser. No. 746,306
4 Claims. (Cl. 88—24)
(Granted under Title 35, U.S. Code (1952), sec. 266)

The invention described herein may be manufactured and used by or for the Government for governmental purposes without the payment of any royalty thereon.

This invention relates to a means (and method) for taking photographs and particularly to means for automatically controlling the admittance of light to the sensitive material in a predetermined manner calculated to correct or modify inherent maladjustment of photographic emulsions to extremes of highlight intensity and deep shadows.

It is well-known that sensitive materials such as silver chloride emulsions follow a quite definite pattern of response throughout their full range of sensitivity as represented by the well-known H and D curve. For most emulsions the extreme ends of this curve show a substantial deviation from the uniform ratio of exposure and density represented by the central or so-called straight line portion of the curve. Those portions of a photograph wherein the tones or densities extend into the toe and high shoulder portion of the curve fail to truthfully represent the subject.

The practice of the invention herein presented automatically corrects for the above discrepancies while the picture is being taken and moreover by providing adjustable controls the degree of correction may be shifted above or below the normal compensating adjustment whereby certain desired abnormal effects may be realized.

In the photographic arts many modes of correction of tonal values are practiced to obtain normal or abnormal visual effects. By the use of filters on the lens a wide variety of corrective or abnormal effects may be obtained. However, the use of filters increases the exposure time and distorts tonal values to an undesirable extent. Compensating filters unavoidably introduce errors of chromatic origin which for many purposes are not tolerable.

Corrections and alterations of a photograph are also accomplished by manual manipulation after a record has been made in the camera and during printing procedures. By such means approximate corrections may be achieved but the procedure is prolonged and difficult and results are, in many instances, not accurately reproducible. Such difficulties are overcome by the present invention.

In a practical embodiment of the invention a camera of novel construction exposes a photosensitive emulsion and produces a preconceived corrective or modified effect directly in the emulsion without filters or subsequent chemical or other after-treatments.

To expose the emulsion a lens and high speed radiation modulator are arranged in a light tight casing. The modulator controls the admittance of light during the exposure of a sensitive film supported within the casing at the focal plane of the lens. The term radiation modulator is used in its broad sense and is intended to relate to any means for controlling light passing thru the lens. At one side of the lens out of the path of incident light a sensing means is positioned to receive and measure radiation reflected from the image bearing sensitive film. A second sensing means is positioned at another position to receive reflected radiation from the film. The output of the sensing means is fed to radiation valving means which in turn modifies admittance of radiation in accordance with the intensity of the illumination on the film. The modification of the radiation accomplished by this means is so arranged that errors of delineation of the tonal values of the subject are corrected. Details of the nature and operation of the automatic controls will appear more fully hereinafter.

The controlling devices act to adjust the light flux reaching the individual areas of the sensitive film in such a manner that the complete tonal scale of the resulting picture will be correct.

As above stated adjustments in the sensing ranges of the controls provide other than normalized results which may be desired for specific purposes.

It is a primary object of the invention to provide a photographic system wherein a picture is taken in which the image intensity incident on the sensitive material is automatically controlled by the integrated radiation reflected from successive small areas thereof.

A further object of the invention is to provide in a photographic system automatic means operative to correct the tonal rendering of those portions of a picture which conventional procedures render in abnormal tonal scale.

A further object of the invention is to provide a photographic system wherein at least a portion of the total exposure reaching the sensitive film is obtained at least partly by a scanning operation wherein the image intensity of the individual increments of area is automatically modified to apply uniform printing radiation upon all areas of the film.

Other objects and features of the invention will more fully appear from the following description and will be specifically pointed out in the claims.

To provide a better understanding of the invention a specific embodiment thereof will be described and illustrated in the drawings, wherein FIG. 1 is a diagrammatic representation of the invention.

Figure 2:
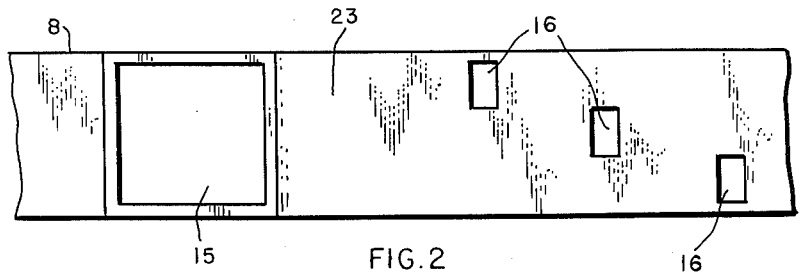

FIG. 2 is a developmental view of the curtain for admitting radiation to the sensitive sheet.

The components of the invention desirably are inclosed in a casing shown diagrammatically in dotted lines in FIG. 1. In this construction the device may serve as portable equipment. The invention, however, may be permanently installed as photographic recording apparatus in a laboratory or darkroom. A lens 5 and a coacting light modulator 6 are mounted in a wall of the casing to admit radiation to a sensitized sheet or strip 7. Suitable focusing means not shown may be provided. The film is held in the focal plane of the lens in any suitable manner such as by means of a film holder not shown.

The light modulator 6 desirably is of the fast acting type having minimum inertia in its active elements to provide extra fast response to a controlling impulse be it mechanical or electronic. The modulator 6 may be a Kerr cell or an electromechanical device such as adjustable iris diaphragm operated by the movement of a D'Arsonval moving coil mechanism. In addition to the modulator 6 a further light controlling means is provided in the form of a curtain 8 operating at or adjacent the focal plane 9. The curtain functions by traversing the format of the camera and may be supported and driven in any suitable manner. As shown in the drawings the curtain is an endless strip traversing suitably positioned rolls 10, 11, 12 and 13 and extending the full width across the picture format. At least one of the rolls such as the roll 10 is driven by a suitable motor 14 which is actuated in a manner to be described.

The curtain is provided with a large opening 15 and spaced therefrom a distance at least as long as the picture format are a plurality of small openings 16. The latter are arranged in staggered relation as shown each opening moves in succession to scan across the film 7 in a plurality of adjacent slightly overlapping parallel areas. In this manner radiation from the subject is impressed upon the film in a succession of separate increments. Since the radiation also passes thru the lens it bears the image of the subject 17 which is focused upon the film 7. The curtain must be nonreflecting.

Sensing means are provided to measure the radiation reflected from the film during its exposure. A first sensing means 18 is positioned to intercept reflected radiation and to avoid interruption of incident radiation passing thru the lens. This sensing means has its output connected to an integrating means 19 which measures the total quantity of light energy reaching the film while the opening 15 is at the picture format. At the end of a predetermined time period measured by the sensing means and integrator 19 an impulse therefrom starts the motor 14 which acts first to close the large aperture 15 and then traverse the scanning openings 16 across the film as a result of which additional exposure is imposed upon the film. Such additional exposure, however, is modified thru the action of a second sensing means 20 whose amplified output is fed to the light modulator 6. The sensing means 20 integrates the instantaneous light flux reaching the film 7 during the scanning operation and the changes in radiation intensity due to varied tonal values in the subject are detected and transformed into electrical impulses proportional to the radiation flux density by the modulator control 21. The impulses are fed to the modulator 6 which acts to modulate the radiation flux passing thru the lens in such a manner that substantially constant illumination of the successive scanned areas of the film takes place. Thus uniformly exposed pictures are obtained directly in the picture taking device despite the presence in the subject of objects having widely different illumination levels.

The integrated exposure for the whole area of the picture as detected by the sensing means 18 is adjusted to be a predetermined amount less than that required for a full normal exposure. It was found that the sum of the two exposures as obtained in the practice of the invention produced a picture having faithful tonal scale representing the portions of the subject in deep shade or those intensely illuminated with a clarity equal to the normally illuminated areas.

It should be noted also that by adjusting the response of the sensing devices and the radiation admitting means a wide variety of effects may be created in the picture.

The sequence of operation of the elements of the apparatus may be varied to suit a particular circumstance. A specific example is to so coordinate the active components that the exposure based on an integrated measurement of the illumination upon the full area of the film is first made and then the scanning operation completes the exposure. This sequence may if desired be reversed. Other exposure sequences may also be practiced. For example, a first overall exposure may be made followed by a scanned exposure and a second overall exposure.

In the following description of operation it is assumed that a prior exposure has been completed and the device is ready for another exposure. At this time the endless curtain 8 has made a complete cycle and its motor 14 has stopped it at a position where the picture area is covered. At this time the modulator 6 is closed to a relatively small minimum setting for example an adjustment equal to 16 which desirably is its normal inactive state.

To start the exposure cycle the curtain motor is started by some external means manual or otherwise. A suitable means such as the starter 22 connected to the motor may be provided. The curtain is thus moved into position with the opening 15 exposing the full film format at which time it is stopped by the motor or other means. Radiation reflected from the film will now immediately energize the sensing means 18 whose output is applied to the adjustable curtain control 19. At this time the sensing member 20 is in effect inoperative because its output is adjusted for correct response at the low output resulting from scanning by the apertures 16 and the output from the larger area it is now receiving tends only to maintain its minimum setting. To provide the correct degree of control the unit 19 is adjusted to the required sensitivity corresponding to the speed and special characteristics of the type of film in use.

The device 21 may consist of a conventional amplifier wherein the amplitude of its output is adjustable in any suitable manner as by varying the grid bias on one or more variable Mu tubes in the circuit.

At this time the sensing means 18 is acting to integrate the total quantity of light reaching the film. When the film has received a predetermined quantity of light, less than that sufficient for full normal exposure, the curtain control unit 19 connected to the sensing means 18 will function to transmit a pulse for actuating a relay or other means to start the motor 14 which in turn moves the portion 23 of the curtain across the film format to terminate this portion of the exposure. The curtain then continues to travel and moves the scanning apertures 16 across the film to perform the scanning operation after which the motor stops the curtain to end the exposure cycle.

During the scanning process the sensing means 20 reads the radiation intensity on successive small areas of the film which regulates the light modulator to provide substantially uniform exposing illumination upon all areas of the film. The low output of the sensor 20 at this time causes the modulator 6 to function at transmission settings well above the said minimum.

The invention in its broad aspect contemplates operation of the device with a single sensing element, for example, the element 20 in which case a switching means could be inserted in the connection from the sensing means to the modulator control 21 and a connection added extending from the switch to the curtain control 19. The switch would alternately connect the curtain control and the shutter control to produce the combined corrected exposure.

It should be stated also that it is possible to use the apparatus without the automatic control 19 and the sensing means 18. When this is done a reading of the overall level of illumination of the subject is manually obtained with a conventional portable exposure meter. This reading is then used to determine a manual adjustment of the apparatus for obtaining correct exposure for that portion of the total exposure otherwise automatically obtained by the curtain control 19 and sensing means 18. This latter exposure may be obtained with a conventional shutter having an adjustable exposure scale or may be provided by operation of a presettable timing device connected to the motor 14 and curtain 8.

What is claimed is:

1. Photographic recording apparatus comprising a photosensitive surface, a lens for focusing a radiation pattern on said surface, a scanning curtain having a large opening the size of the picture format and at least one small opening spaced longitudinally therefrom, means for traversing said curtain adjacent to said surface whereby a partial exposure of the whole picture area is made by the large opening and the balance of the exposure is made by the scanning action of the small opening, sensing means for measuring the radiation reflected from said surface during the exposure, radiation modulating means for regulating the admittance of radiation to said surface and means responsive to said sensing means operable to actuate said modulator to provide regulated exposing illumination upon all areas of said sensitive surface.

2. Photographic recording apparatus according to claim 1 and wherein the controlling elements therein are adjusted to provide substantially uniform exposing radiation upon all areas of said sensitive surface during the scanning operation.

3. Photographic recording apparatus according to claim 1 and wherein the said curtain contains a plurality of staggered small openings spaced from the large opening and arranged to successively scan different areas of the said sensitive surface comprising the total picture format.

4. Photographic recording apparatus comprising a photosensitive surface, a lens for focusing a radiation pattern on said surface, a scanning curtain having a large opening the size of the picture format and a plurality of small scanning openings staggered longitudinally and laterally of said curtain and spaced from said large opening, means for traversing said curtain adjacent to said surface whereby a partial exposure of the whole picture area is made by the large opening and the balance of the exposure is made by the scanning action of the small openings, a first sensing means for measuring radiation reflected from said surface during exposure by said large opening by integration of light flux entering a small fixed opening of said lens, a second sensing means measuring radiation reflected from said surface during the scanning of said smaller openings, radiation modulating means connected to said second sensing means acting to regulate the admittance of radiation thru said lens during said scanning operation.

References Cited in the file of this patent

UNITED STATES PATENTS

| | | |
|---|---|---|
| 2,691,917 | Curry | Oct. 19, 1954 |
| 2,764,060 | Horak | Sept. 25, 1956 |
| 2,806,415 | Friedberg | Sept. 17, 1957 |
| 2,842,025 | Craig | July 8, 1958 |

FOREIGN PATENTS

| | | |
|---|---|---|
| 713,285 | Great Britain | Aug. 11, 1954 |